United States Patent
Pruett et al.

(10) Patent No.: US 6,564,199 B1
(45) Date of Patent: May 13, 2003

(54) KAOLIN CLAY PIGMENTS, THEIR PREPARATION AND USE

(75) Inventors: Robert J. Pruett, Milledgeville, GA (US); Jun Yuan, Milledgeville, GA (US); Harry Vincent Brown, Jr., Sandersville, GA (US); David O. Cummings, Warthen, GA (US)

(73) Assignee: Imerys Pigments, Inc., Roswell, GA (US)

( * ) Notice: Subject to any disclaimer, the term of this patent is extended or adjusted under 35 U.S.C. 154(b) by 0 days.

(21) Appl. No.: 09/937,671

(22) PCT Filed: Mar. 31, 2000

(86) PCT No.: PCT/US00/08485
§ 371 (c)(1),
(2), (4) Date: Dec. 20, 2001

(87) PCT Pub. No.: WO00/59841
PCT Pub. Date: Oct. 12, 2000

Related U.S. Application Data
(60) Provisional application No. 60/127,379, filed on Apr. 1, 1999.

(51) Int. Cl.$^7$ ................................................ C04B 14/04
(52) U.S. Cl. ...................... 706/486; 106/416; 106/484; 106/487
(58) Field of Search .............................. 106/486, 416, 106/487, 484

(56) References Cited

U.S. PATENT DOCUMENTS

| | | | |
|---|---|---|---|
| 2,158,987 A | 5/1939 | Maloney | |
| 3,034,859 A | 5/1962 | Gunn et al. | |
| 3,171,718 A | 3/1965 | Gunn et al. | |
| 3,526,768 A | 9/1970 | Rai et al. | |
| 3,615,806 A | 10/1971 | Torock et al. | |
| 3,635,662 A | 1/1972 | Lyons | |
| 3,798,044 A | 3/1974 | Whitley et al. | |
| 4,125,411 A | 11/1978 | Lyons | |
| 4,176,148 A | 11/1979 | Magder et al. | |
| 4,183,991 A | 1/1980 | Smiley et al. | |
| 4,198,333 A | 4/1980 | von Bonin et al. | |
| 4,221,697 A | 9/1980 | Osborn et al. | |
| 4,225,496 A | 9/1980 | Columbus et al. | |
| 4,227,920 A | 10/1980 | Chapman et al. | |
| 4,233,199 A | 11/1980 | Abolins et al. | |
| 4,234,469 A | 11/1980 | Ohta et al. | |
| 4,241,142 A | 12/1980 | Kaliski et al. | |
| 4,243,574 A | 1/1981 | Manwiller | |
| 4,250,077 A | 2/1981 | van Bonin et al. | |
| 4,251,576 A | 2/1981 | Osborn et al. | |
| 4,298,711 A | 11/1981 | Moulson et al. | |
| 4,311,635 A | 1/1982 | Pearson | |
| 4,359,497 A | 11/1982 | Magder et al. | |
| 4,381,948 A | 5/1983 | McConnell et al. | ........ 106/288 |
| 4,409,344 A | 10/1983 | Moulson et al. | |
| 4,414,352 A | 11/1983 | Cohen et al. | |
| 4,427,450 A | 1/1984 | Kostansek | |
| 4,467,057 A | 8/1984 | Dieck et al. | |
| 4,543,287 A | 9/1985 | Briggs et al. | |
| 4,546,126 A | 10/1985 | Breitenfellner et al. | |
| 4,582,866 A | 4/1986 | Shain | |
| 4,584,333 A | 4/1986 | Prigent et al. | |
| 4,708,975 A | 11/1987 | Shain | |
| 4,795,776 A | 1/1989 | Milner | |
| 4,820,761 A | 4/1989 | Saito et al. | |
| 4,873,116 A | 10/1989 | Ancker | |
| 4,888,315 A | 12/1989 | Bowman et al. | |
| 4,918,127 A | 4/1990 | Adur et al. | |
| 4,943,324 A | 7/1990 | Bundy et al. | |
| 4,966,638 A | 10/1990 | Mudgett | |
| 4,981,521 A | 1/1991 | Bettacchi et al. | |
| 5,085,707 A | 2/1992 | Bundy et al. | |
| 5,112,782 A | 5/1992 | Brown et al. | |
| 5,128,606 A | 7/1992 | Gate et al. | |
| 5,167,707 A | 12/1992 | Freeman et al. | |
| 5,168,083 A | 12/1992 | Matthews et al. | |
| 5,169,443 A | 12/1992 | Willis et al. | |
| 5,294,654 A | 3/1994 | Hellstern-Burnell et al. | |
| 5,332,493 A | 7/1994 | Ginn et al. | ................. 209/164 |
| 5,364,899 A | 11/1994 | Watanabe et al. | |
| 5,411,587 A | 5/1995 | Willis et al. | |
| 5,416,151 A | 5/1995 | Tanaka | |

(List continued on next page.)

FOREIGN PATENT DOCUMENTS

| | | |
|---|---|---|
| DE | 2 241 577 | 3/1973 |
| DE | 24 49 656 | 12/1975 |
| DE | 26 58 814 | 2/1978 |

(List continued on next page.)

OTHER PUBLICATIONS

Brochure: "Kaopaques Delaminated Aluminum Silicates for Paint Systems," Georgia Kaolin Co., 433 N. Broad Street, Elizabeth, NJ 07207, Oct. 1975.

(List continued on next page.)

*Primary Examiner*—C. Melissa Koslow
*Assistant Examiner*—Shalie Manlove
(74) *Attorney, Agent, or Firm*—Finnegan, Henderson, Farabow, Garrett & Dunner, L.L.P.

(57) ABSTRACT

A paper coating pigment manufactured from kaolin crude containing minor amounts of minerals is used in lightweight coated and ultra-lightweight coated applications. The pigments comprise a phyllosilicate assemblage of minerals that yield a final pigment MgO content ranging between 0.04 to 0.3 weight percent and a $K_2O$ content ranging between 0.12 and 0.8 weight percent based on the dry weight of the kaolin crude. The mica in the pigment product is 1.0% to 6.7% by weight, and smectite is 1.2% to 9.1% by weight of the kaolin. The presence of these weight percentages can be identified by a shape factor of 15 or greater. The viscous clay content of the feed to produce the pigment product is between 70 and 100 weight percent based on the dry weight of the kaolin clay. The pigment has a shape factor ranging between 35 and 60 or greater, and greater than 80% by weight of the particle are less than 2 microns, and greater than 12% are less than 0.25 microns.

30 Claims, No Drawings

U.S. PATENT DOCUMENTS

| | | | |
|---|---|---|---|
| 5,439,558 A | 8/1995 | Bergmann et al. | |
| 5,454,865 A | 10/1995 | Ginn et al. | |
| 5,516,829 A | 5/1996 | Davis et al. | |
| 5,522,924 A | 6/1996 | Smith et al. | |
| 5,573,946 A | 11/1996 | Haxell et al. | |
| 5,578,659 A | 11/1996 | Anada et al. | |
| 5,624,488 A | 4/1997 | Forbus et al. | |
| 5,645,635 A | 7/1997 | Behl et al. | |
| 5,685,900 A | 11/1997 | Yuan et al. | |
| 5,707,912 A | 1/1998 | Lowe et al. | 501/147 |
| 5,735,946 A | 4/1998 | Bloodworth et al. | |
| 5,749,958 A | 5/1998 | Behl et al. | |
| 5,810,998 A | 9/1998 | Arrington-Webb et al. | |
| 5,846,309 A | 12/1998 | Freeman et al. | |
| 5,879,512 A | 3/1999 | McGenity et al. | |
| 5,948,156 A | 9/1999 | Coutelle et al. | 106/486 |
| 6,031,036 A | 2/2000 | Rosenquist et al. | |
| 6,149,723 A | 11/2000 | Pruett et al. | |
| 6,186,335 B1 | 2/2001 | Arrington-Webb et al. | |
| 6,262,161 B1 | 7/2001 | Betso et al. | |
| RE37,385 E | 9/2001 | Okada et al. | |
| 6,402,826 B1 | 6/2002 | Yuan et al. | |

FOREIGN PATENT DOCUMENTS

| | | |
|---|---|---|
| DE | 28 18 954 | 11/1978 |
| DE | 27 39 620 | 3/1979 |
| DE | 30 12 235 | 10/1980 |
| DE | 30 47 269 | 7/1982 |
| DE | 36 32 606 | 4/1987 |
| DE | 35 36 371 | 5/1987 |
| DE | 35 40 524 | 5/1987 |
| DE | 37 50 864 | 4/1988 |
| DE | 38 84 605 | 8/1988 |
| DE | 43 01 730 | 7/1993 |
| DE | 42 13 746 | 10/1993 |
| DE | 100 10 941 | 9/2001 |
| EP | 0 001 066 | 4/1980 |
| EP | 0 026 075 | 4/1981 |
| EP | 0 054 424 | 6/1982 |
| EP | 0 132 094 | 1/1985 |
| EP | 0 132 228 | 1/1985 |
| EP | 0 160 777 | 11/1985 |
| EP | 0 163 427 | 12/1985 |
| EP | 0 217 626 | 4/1987 |
| EP | 0 222 138 | 5/1987 |
| EP | 0 222 298 | 5/1987 |
| EP | 0 239 986 | 10/1987 |
| EP | 0 245 553 | 11/1987 |
| EP | 0 262 649 | 4/1988 |
| EP | 0 274 888 | 7/1988 |
| EP | 0 341 981 | 11/1989 |
| EP | 0 352 714 | 1/1990 |
| EP | 0 456 363 | 11/1991 |
| EP | 0 475 434 | 3/1992 |
| EP | 0 528 078 | 2/1993 |
| EP | 0 586 904 | 3/1994 |
| EP | 0 588 239 | 3/1994 |
| EP | 0 589 461 | 3/1994 |
| EP | 0 596 442 | 5/1994 |
| EP | 0 691 375 | 1/1996 |
| EP | 0 824 130 | 2/1998 |
| EP | 1 088 852 | 4/2001 |
| FR | 2 150 953 | 4/1973 |
| FR | 2 273 040 | 12/1975 |
| FR | 2 359 874 | 2/1978 |
| FR | 2 389 645 | 12/1978 |
| FR | 2 452 511 | 10/1980 |
| FR | 2 558 168 | 7/1985 |
| FR | 2 774 689 | 8/1999 |
| GB | 1032536 | 6/1966 |
| GB | 1118723 | 7/1968 |
| GB | 1375057 | 11/1974 |
| GB | 1469028 | 3/1977 |
| GB | 1493393 | 11/1977 |
| GB | 1513657 | 6/1978 |
| GB | 1597213 | 9/1981 |
| GB | 2223758 | 4/1990 |
| GB | 2240398 | 7/1991 |
| GB | 2310215 | 8/1997 |
| JP | 51005383 | 1/1976 |
| JP | 53016063 | 2/1978 |
| JP | 54010394 | 1/1979 |
| JP | 54047751 | 4/1979 |
| JP | 55131024 | 10/1980 |
| JP | 59074152 | 4/1984 |
| JP | 60023448 | 2/1985 |
| JP | 60038455 | 2/1985 |
| JP | 60084364 | 5/1985 |
| JP | 60161443 | 8/1985 |
| JP | 60235858 | 11/1985 |
| JP | 62116667 | 5/1987 |
| JP | 62232452 | 10/1987 |
| JP | 63132964 | 6/1988 |
| JP | 63175047 | 7/1988 |
| JP | 02-018362 | 1/1990 |
| JP | 02034653 | 2/1990 |
| JP | 02045551 | 2/1990 |
| JP | 04122752 | 4/1992 |
| JP | 05262974 | 10/1993 |
| JP | 06016918 | 1/1994 |
| JP | 06065490 | 3/1994 |
| JP | 06502684 | 3/1994 |
| JP | 06145442 | 5/1994 |
| JP | 07502068 | 3/1995 |
| JP | 08022945 | 1/1996 |
| JP | 10114854 | 5/1998 |
| JP | 2000345032 | 12/2000 |
| JP | 2001098149 | 4/2001 |
| WO | WO 80/01167 | 6/1980 |
| WO | WO 80/02430 | 11/1980 |
| WO | WO 88/05804 | 8/1988 |
| WO | WO 90/11605 | 10/1990 |
| WO | WO 93/04119 | 3/1993 |
| WO | WO 94/07956 | 4/1994 |
| WO | WO 97/32934 | 9/1997 |
| WO | WO 97/34956 | 9/1997 |
| WO | WO 9837152 | 8/1998 |
| WO | WO 98/56860 | 12/1998 |
| WO | WO 98/58613 | 12/1998 |
| WO | WO 99/41309 | 8/1999 |
| WO | WO 99/51815 | 10/1999 |
| WO | WO 99/58613 | 11/1999 |
| WO | WO 00/05311 | 2/2000 |
| WO | WO 00/59840 | 10/2000 |
| WO | WO 00/59841 | 10/2000 |
| WO | WO 00/66657 | 11/2000 |
| WO | WO 01/12708 | 2/2001 |
| WO | WO 01/46307 | 6/2001 |
| WO | WO 01/66627 | 9/2001 |
| WO | WO 01/66635 | 9/2001 |

OTHER PUBLICATIONS

Burgess, Malcolm, "Kaolin, a Glaciers Gift to Georgia," 1985.

Clay Minerals Society Homepage, http://cms/lanl.gov/instruct.html, "Instructions for Authors, Clays and Clay Minerals," *Instructions for Authors*, p. 4 of 5.

Jepson, W. P., "Kaolins, their properties and uses," *Phil. Trans. R. Soc. Lond.*, A311, 411–432, 1984.

Swan, A., "Realistic paper tests for various printing processes," *Printing Technology*, 13(1), 9–22, Apr., 1969.

Abstract, Japanese Patent No. 08012886A, publication date Jan. 1996.

Abstract, German Patent No. 3679147.

Abstract, German Patent No. 3689760.

Abstract, German Patent No. 3565272.

Abstract, German Patent No. 3466547.

KAOLIN CLAY PIGMENTS, THEIR PREPARATION AND USE

This application is a national phase application based on International Patent Application No. PCT/US00/08485, filed Mar. 31, 2000, and claims the benefit of U.S. Provisional Application No. 60/127,379, filed Apr. 1, 1999, the contents of both flare incorporated herein by reference.

FIELD OF THE INVENTION

The present invention relates to kaolin raw materials to produce novel kaolin clay pigments especially useful for coating lightweight and ultra-lightweight paper for rotogravure and offset printing. More particularly, the invention relates to the use of kaolin crude having a desired amount of non-kaolin phyllosilicate clay minerals to produce mechanically delaminated kaolin coating pigments. These pigments possess a unique combination of desirable properties not available in other kaolin pigments. When used in certain coating compositions, these pigments yield superior gloss in coated and printed papers compared to other kaolin pigments.

BACKGROUND OF THE INVENTION

Paper coating compositions are generally prepared by forming a fluid aqueous suspension of pigment material together with a hydrophilic adhesive and other optional ingredients.

Lightweight coated, or LWC, paper is generally coated to a weight of from bout 5 g.m$^{-2}$ to about 13 g.m$^{-2}$ on each side, and the total grammage, or weight per unit area of the coated paper is generally in the range of from about 49 g.m$^{-2}$ to about a5 g.m$^{-2}$. LWC paper is generally used for printing magazines, catalogues and advertising or promotional material. The coated paper is required to meet certain standards of surface gloss and smoothness. For example, the paper is generally required to have a gloss value of at least about 32, and up to about 50, TAPPI units, and a Parker Print Surf value in the range of from about 0.5 to about 1.6 $\mu$m.

Ultra lightweight coated, or ULWC, paper is sometimes otherwise known as light lightweight coated, or LLWC, paper and is used for catalogues and for advertising and promotional material sent through the mail to reduce mailing costs. The coating weight is generally in the range of from 5 g.m$^{-2}$ to 7 g.m$^{-2}$ per side. The grammage is generally in the range of from about 35 g.m$^{-2}$ to about 48 g.m$^{-2}$.

A very important white inorganic pigment for use in preparing coating compositions for the manufacture of LWC and ULWC papers for rotogravure or offset printing is kaolin obtained from kaolin clay. Large deposits of kaolin clay exist in Devon and Cornwall, England and in the States of Georgia and South Carolina, United States of America. Important deposits also occur in Brazil, Australia, and in several other countries.

Kaolin clay, also referred to as china clay or hydrous kaolin, consists predominantly of mineral kaolinite ($Al_2Si_2O_5(OH)_4$), an hydrous aluminum silicate, together with small concentrations of various other minerals.

Some of these other minerals in kaolin, such as fine ferruginous or titaniferous impurities impart undesirable color to the clay. Many processing techniques are known to remove significant amounts of these impurity minerals.

Additional minerals in kaolin, which fall into a classification of silicates and referred to as phyllosilicates, comprise mica, smectite, vermiculite, hydrobiotite, mixed or layered illite-smectite or mixed layers of other clay minerals. These latter minerals are known to have higher water adsorption capability than kaolinite, and therefore, generally have an undesirable effect on the rheology of high solids kaolin-water suspensions. That is, these minerals cause the suspensions or slurries to thicken and become more viscous at high and low shear rates. The kaolin industry generally avoids mining clays with micaceous or smectitic minerals. Alternatively, the kaolin industry removes micaceous and smectitic minerals with processes, such as desliming, or the industry blends such clays with relatively pure kaolin ores to reduce the concentration of micaceous and smectitic minerals to a level that does not affect clay-water suspension rheology. Examples of such beneficiation techniques include U.S. Pat. Nos. 4,182,785; 4,334,985; 4,477,422; and 5,593,490.

Kaolinite is an hydrous aluminosilicate that exists in the form of clay-sized crystals in the shape of thin hexagonal plates or in booklets of platelets called "stacks". Kaolinite stacks may be subjected to a grinding action to easily separate or delaminate them into individual plates.

As long ago as 1939, Maloney disclosed in U.S. Pat. No. 2,158,987 that the finish, or gloss, of a clay coated paper is greatly improved if the clay, before incorporation in the coating composition, is treated so that a large percentage, for example 80% by weight or more, of the clay particles have a size in the range of 0.1 $\mu$m to 2 $\mu$m. In order to increase the proportion of fine particles in the raw kaolin, the raw kaolin may, according to the disclosure in U.S. Pat. No. 2,158,987 be subjected, before the centrifuging step, to a grinding or delamination operation in which a suspension containing from about 50% to about 75% by dry weight of kaolin and a dispersing gent is subjected to pebble milling. When the kaolin from the finer fraction is recovered, mixed with a suitable paper coating binder, and applied to the surface of a base paper, a coating of good gloss and color is obtained.

Various pigment products which are made using the principles described by Maloney in U.S. Pat. No. 2,158,987 are commercially available and provide good gloss and smoothness in coated papers, especially for LWC and ULWC paper. For example, a pigment product available from Imerys Minerals Ltd., formerly ECC International Ltd., and recommended for gloss coatings of LWC consists of a refined English kaolin product having a particle size distribution, "psd", such that 89% by weight of the particles have an esd less than 2 $\mu$m, 74% by weight of the particles have an esd less than 1 $\mu$m and 25% by weight of the particles have an esd less than 0.25 $\mu$m.

Generally, the commercially available pigment products used for gloss coatings of LWC and ULWC paper are delaminated kaolin products, that is, they are subjected to a grinding process in order to break the stacks into plates. For a typical delaminated product, a kaolin clay slurry may be subjected to magnetic separation, grinding or delaminating, classifying, leaching, and filtering. The kaolin may be spray dried or formed into slurry containing 65% solids. Delaminated kaolin pigments can be made into flowable slurry at 65% solids as compared to kaolin pigments at 70% solids. Solids concentration lower than 65% has been considered undesirable.

A kaolin product of high shape factor is considered to be more "platy" than a kaolin product of low shape factor. "Shape factor", as used herein, is a number that represents an average aspect ratio value (on a weight average basis) of particles, that is the ratio of particle diameter to particle thickness for a population of particles of varying size and shape as measured using the electrical conductivity method and apparatus described in GB-A-2240398/U.S. Pat. No. 5,128,606/EP-A-0528078 and in U.S. Pat. No. 5516617 and using the equations derived in these patent specifications. "Mean particle diameter" is defined as the diameter of a circle which has the same area as the largest face of the particle.

In the measurement method described in GB-A-2240398/U.S. Pat. No. 5,128,606/EP-A-0528078 the electrical conductivity of a fully dispersed aqueous suspension of the particles under test is caused to flow through an elongated tube. Measurements of the electrical conductivity are taken between (a) a pair of electrodes separated from one another along the longitudinal axis of the tube, and (b) a pair of electrodes separated from one another across the transverse width of the tube, and using the difference between the two conductivity measurements the shape factor of the particulate material under test is determined.

The kaolin deposits in England are of primary kaolin, whilst those in the USA are of the primary and secondary types. Kaolin was formed in geological times by the hydrothermal decomposition or by the weathering of the feldspar and mica components of granite and feldspathic metamorphic rocks, and primary kaolin is that which is obtained directly from the crystalline rock matrix in which it was originally formed. On the other hand, secondary kaolin, also known as sedimentary kaolin, has been washed out of the original primary kaolin matrix in geological times and has been deposited in an area remote from the site in which it was originally formed. Secondary kaolin deposits tend to have a higher proportion of fine particles, such as those having an esd smaller than 2 μm, because the kaolin has undergone a certain amount of natural grinding and sorting during the course of its transport from its site of origin to its site of final deposition.

Kaolin products generally are produced from a kaolin crude which is mined from the zones or strata in the primary and secondary clay deposits that contain the highest concentration of kaolinite and lowest concentration of other clay-sized 2:1 phyllosilicate minerals. In the past, the kaolin clay mineral producing industries, particularly in Georgia, have avoided using lower quality crude ores that contain elevated levels of minor minerals, such as the phyllosilicates, including mica, smectite, vermiculite, hydrobiotite, mixed or layered illite-smectite or mixed layers of other clay minerals. These minor minerals had been considered to be impurities which made the kaolin crude undesirable for standard wet-processed and delaminated products because of the poor clay-water viscosity.

Unexpectedly, the inventors have discovered that the kaolin crudes containing certain amounts of non-kaolinite phyllosilicates possess greater aspect ratio, that is, the kaolin crudes are more "platy", than conventionally used kaolin crude clays. By using these particular crude clays, the inventors have found a method to make novel products which possess significantly higher aspect ratio, greater amounts of non-kaolinite minerals, and lower, flowable solids concentration of kaolin-water suspensions compared to conventional kaolin pigments. These novel pigments with these special properties have been found to yield glossing characteristics for LWC and ULWC coated and printed papers that are far superior to those from other pigments.

SUMMARY OF THE INVENTION

A first aspect of the invention provides a kaolin clay pigment comprising a phyllosilicate assemblage of minerals, such as smectite and mica. Preferably, the kaolin crude ore used to produce the clay pigment comprises smectitic clays, preferably smectite, ranging from 0.9% to about 15.0% by weight, more preferably, from about 1.2% to about 7.6% by weight, and most preferably, from about 1.5% to about 4.5% by weight based on the kaolin clay in the crude. Preferably, the percentage of micacous clays, more preferably mica, in the kaolin crude will range from about 0.9% to about 26.0% by weight, more preferably, from about 1.7% to about 17.0% by weight, and more preferably, from about 4.2% to about 8.6% by weight, based on the dry weight of kaolin clay. The amount of smectitic clays, preferably smectite, appearing in the kaolin clay pigment preferably will range from about 1.2% to about 9.1%, more preferably, from about 1.5% to about 6.0%, and most preferably from about 1.8% to about 3.0% by weight based on the dry weight of the kaolin. The amount of micacous clays, preferably mica, in the kaolin pigment product preferably will range from about 1.0% to about 6.7%, more preferably, from about 1.2% to about 3.4%, and most preferably, from about 1.3% to about 2.1% by weight, based on the dry weight of the kaolin in the pigment product.

Generally, the kaolin crude contains a desirable amount of minerals, such as the phyllosilicates listed herein above. These phyllosilicates, preferably, yield potassium oxides and magnesium oxides where the major oxide concentration of potassium preferably is between about 0.1 to about 3.0% by weight, more preferably, from about 0.2% to about 2.0% by weight, and most preferably, between from about 0.5% to about 1.0% by weight, based on the dry weight of the crude kaolin clay. The major oxide concentration of magnesium in the crude preferably is between about 0.03% to about 0.50% by weight, more preferably, from about 0.04% to about 0.25% by weight, and most preferably, from about 0.05% to about 0.15% by weight, based on the dry weight of the kaolin crude. Such crude may be naturally platy clay, such as those in Middle Georgia, U.S.A. with a shape factor ranging between 15 to 30, or higher.

Preferably, the kaolin pigment is product comprises phyllosilicates, such as smectite and/or mica, where the major oxide concentration of potassium ($K_2O$) preferably, ranges between from about 0.12% to about 0.8% by weight, more preferably, from about 0.14% to about 0.8% by weight, and most preferably, from about 0.15% to about 0.25% by weight, based on the dry weight of the kaolin pigment. The major oxide concentration of Magnesium (MgO) in the pigment product preferably ranges from about 0.04% to about 0.3% by weight, more preferably, from about 0.05% to about 0.2% by weight, and most preferably, from about 0.06% to about 0.1% by weight, based on the dry weight of the kaolin pigment.

The particle size distribution of the kaolin clay pigment may be such that preferably, 80 to 95% by weight of the particles have an equivalent spherical diameter (esd) less than 2 microns.

A method for producing a kaolin pigment product comprises the steps of:
  (a) mixing a raw kaolin clay crude, comprising at least about 0.9% by weight mica and about 0.9% by weight smectite, based on the dry weight of the crude, where the $K_2O$ content ranges between about 0.10% by weight to about 3.0% by weight and the MgO content ranges between about 0.03% by weight to about 0.50% by weight, based on the dry weight of the kaolin clay crude, with water to form an aqueous suspension containing from 20% to 70% of kaolin on a dry weight basis;

(b) subjecting the suspension produced by step (a) to attrition grinding using a particulate grinding medium for a time sufficient to delaminate the majority of stock of kaolin clay crude with a shape factor from about 35 to greater than 60;

(c) separating the suspension of ground kaolin clay from the particulate grinding medium;

(d) subjecting the suspension of step (c) to a particle size classification step; and (e) dewatering the suspension of ground kaolin clay classified in step (d) to recover a pigment product therefrom, said pigment product comprising from about 1.0% to about 6.7% by weight mica and about 1.2% to about 9.1% by weight smectite based on the dry weight of the kaolin clay in the pigment product, where the $K_2O$ content of the pigment product ranges between about 0.12% by weight to about 0.8% by weight and the MgO content of the pigment product ranges from between about 0.04% by weight and about 0.3% by weight, based on the dry weight of the kaolin clay in the pigment product, and the particle size distribution of the final pigment product is such that about 80% to 95% by weight of the particles have an esd less than 2 microns.

In step (e) and as a result of step (d), the kaolin clay particles may have a particle size distribution such that 80% to 95% by weight of the particles have an esd less than 2 microns and at least 12%, preferably 20% to 40%, and most preferably 25% to 35%, by weight of the particles have an esd less than 0.25 microns.

Since the pigment products of the invention are typically 80% to 95% by weight finer than 2 micrometers, and the surface area may be greater than 12 $m^2/g$, and preferably between 15 $m^2/g$ to 20 $m^2/g$ when measured by the BET method, they may be classified as No. 1 kaolin clay pigments. In step (a) the shape factor of the naturally platy clay prior to any delamination or grinding thereof is at least 15 and, preferably, is greater than 25, and most preferably is greater than 30. As a result of the shape factor produced in step (b) above ranging from about 35 to greater than 60, the kaolin clay particles finer than 2 micrometers are extremely, platy. The viscous clay content ranges between about 70 percent to about 100 percent by weight based on the dry weight of the kaolin clay of the processed feed.

The pigment product of the invention has been shown to give greater improvement in sheet brightness, opacity, and gloss as compared to standard products in starch containing binder systems. Pigments of the invention are particularly useful in coating compositions for coating lightweight (LWC) and ultra-lightweight (ULWC) printed paper.

DETAILED DESCRIPTION OF THE INVENTION

The novel hydrous kaolin; pigments of the invention are adapted for coating LWC and ULWC paper adapted to be printed by offset and rotogravure and comprise a major amount of platy kaolin particles where the platiness of the kaolin particles is defined in terms of a "high" shape factor, that is, the average shape factor of the particles of the pigment is at least 35, preferably 55, and desirably greater than 60.

The pigment product according to a first aspect of the present invention may be obtained by treating a raw particulate hydrous naturally platy kaolin mineral obtained from selected zones of the sedimentary kaolin, such as that which occurs in Georgia, USA. Preferably, this crude at least has minor amounts of micaceous and/or smectitic minerals.

Preferably, the kaolin crude ore comprises smectite ranging from about 0.9% to about 15.0% by weight, more preferably, from about 1.2% to about 7.6% by weight, and most preferably, from about 1.5% to about 4.5% by weight based on the kaolin clay in the crude. Preferably, the percentage of mica in the kaolin crude will range from about 0.9% to about 26.0% by weight, more preferably, from about 1.7% to about 17.0% by weight, and more preferably, from about 4.2% to about 8.6% by weight, based on the dry weight of crude kaolin clay. The amount of smectite appearing in the kaolin clay pigment, preferably, will range from about 1.2% to about 9.1%, more preferably, from about 1.5% to about 6.0%, and most preferably, from about 1.8% to about 3.0% by weight, based on the dry weight of the kaolin.

The amount of mica in the kaolin pigment product, preferably, will range from about 1.0% to about 6.7%, more preferably, from about 1.2% to about 3.4%, and most preferably, from about 1.3% to about 2.1% by weight, based on the dry weight of the kaolin in the pigment product.

Generally, the kaolin crude contains a desirable amount of minerals, such as the phyllosilicates listed herein above. These phyllosilicates, preferably, yield bulk $K_2O$ content between about 0.1 to about 3.0% by weight, more preferably, from about 0.2% to about 2.0% by weight, and most preferably, between from about 0.5% to about 1.0% by weight, based on the dry weight of the crude kaolin clay. The MgO content in the crude preferably is between about 0.03% to about 0.50% by weight, more preferably, from about 0.04% to about 0.25% by weight, and most preferably, from about. 0.05% to about 0.15% by weight, based on the dry weight of the kaolin crude. Such crude may be naturally platy clay, such as those in Middle Georgia, U.S.A. with a shape factor ranging between 15 to 30, or higher.

Preferably, the kaolin pigment is product comprises phyllosilicates, such as smectite and/or mica, where the pigment $K_2O$ content ranges between from about 0.12% to about 0.8% by weight, more preferably, from about 0.14% to about 0.8% by weight, and most preferably, from about 0.15% to about 0.25% by weight, based on the dry weight of the kaolin pigment. The MgO in the pigment product ranges from about 0.04% to about 0.3% by weight, more preferably, from about 0.05% to about 0.2% by weight, and most preferably, from about 0.06% to about 0.1% by weight, based on the dry weight of the kaolin pigment.

The particle size distribution of the kaolin clay pigment may be such that 80% to 95%, preferably 85% to 92%, and most preferably, 88% to 92% by weight have an equivalent spherical diameter (esd) less than 2 microns, and at least 12, preferably from 20 to 40%, and most preferably from 25% to 35% by weight have an equivalent spherical diameter less 0.25 micrometers or microns.

The kaolin pigments of the invention may have the following further characteristics:

Bulk Chemistry of Kaolin Pigment Product

Smectite, in the form of calcium montmorillonite typically found in Georgia kaolin generally has the formula $Ca_{0.15}(Mg_{0.3}Al_{1.7})SiO_4(OH)_2$. Micas found in Georgia kaolin can be represented by the formula $K(Al_{1.806}Fe_{0.194})Al\,Si_3O_{10}(OH)_2$ Weathered micas, illite and the illite layers in mixed layered illite-smectite may contain 70% or less of the potassium level, on a molar basis, shown in the formula for a typical mica from Georgia kaolin. Kaolin pigment products having minor amounts of minerals contain potassium and magnesium in their crystal structures. The proportions of these elements in the minor clay minerals and their total concentration after processing yields pigments having $K_2O$ content ranging between about 0.12 to about 0.8% by weight and MgO content ranging between about 0.04% and 3.0% by weight, based on the dry weight of the kaolin pigment.

Platy Content

Viscous clay content of the feed to produce pigment products is between 70 to about 100 weight percent, based on the dry weight of the kaolin clay.

Surface Area

BET surface area greater than 12 $m^2/g$, preferably ranging between 15 $m^2/g$ to 20 $m^2/g$.

Solids Content

The solids content may be at least 50% by weight, preferably ranging from 61.0 to about 64.0% by weight of kaolin clay particles in dry weight form.

The starting crude ore useful in the invention generally is viscous, sedimentary kaolin containing micas, mixed-layered clay minerals, smectites, and vermiculites or hydrous micas. A "viscous" kaolin clay can be defined as being a clay that will not make-down into a clay-water slurry at greater than or equal to 70% solids. Such crude may have a shape factor equal to or greater than 15, preferably, equal to or greater than 25.

One investigation performed by the inventors found several sedimentary kaolin localities in Middle Georgia that contain platy clay with some localities having marginally platy clay. These deposits can be classified into six different mineralogical groups which are summarized in Table 1 below.

TABLE 1

| Platy-Clay Group | Mineral Content | | | |
|---|---|---|---|---|
| | Kaolinite | Illite | Smectite | I/S |
| I | Nearly Pure | | | |
| II | Major | | | Trace |
| III | Major | Trace Or Minor | | |
| IV | Major | | Trace | |
| V | Major | Trace | Trace | |
| VI | Trace | Trace | Major | |

The kaolin resources used in the invention pertain to Groups II, III, IV and V of Table 1, which in addition to containing mostly kaolinite, have minor amounts of illite, smectite, or illite-smectite (I/S).

The presence of the different minor minerals, such as phyllosilicates, including smectite, illite, and illite-smectite, in the kaolin crudes is detected by X-Ray powder diffraction analysis. These minerals differ from kaolinite in that these minerals are generally 2:1 sheet silicates having interlayer cations.

Mica, illite, and illite layers in mixed-layered clay minerals contain potassium as an interlayer cation in their structure. The potassium in the interlayer site acts to compensate for a negative charge imbalance caused by the aluminum substitution for silicon in the tetrahedral layer of these minerals. The inventors have found that the potassium level is a precise indicator of the concentration of these minerals in Georgia sedimentary kaolins because no other potassium-bearing minerals, such as potassium feldspar, are present in significant amounts.

Smectite in the Georgia sedimentary clays is generally a calcium montmorillonite, which, in turn, has magnesium in its octahedral layer. Mica, illite, and illite-smectite can have minor levels of magnesium in their crystal structures, but the inventors have found that the magnesium concentration in Georgia sedimentary kaolins is a relatively precise measurement of smectite content because no other magnesium-bearing minerals with significant levels of magnesium in their structures are present in significant amounts.

Preferably, the kaolin clay crude used in the invention is comprised of about 0.10% to about 3.0% by weight of potassium oxide and about 0.03% to about 0.50% by weight of magnesium oxide. As stated hereinabove, these elements are structural components of minor phyllosilicate phases in the kaolin, and the phyllosilicates are mixed in with the kaolinite. The result is a mixture of platy kaolinite particles and platy non-kaolinite phyllosilicate particles that may have a higher average diameter to thickness ratio than the kaolinite particles.

X-Ray Flourescence (XRF) analysis can be a more sensitive method to X-Ray powder diffraction analysis for determining the minor clay mineral content in Georgia sedimentary clays. XRF is an instrument that determines the weight percentage of potassium oxide ($K_2O$) and magnesium oxide (MgO) in kaolin materials. The $K_2O$ and MgO content of kaolin materials are then divided by the $K_2O$ or MgO content of the pure mica or smectite phase to determine mica and smectite content of the kaolin material.

As stated above, the starting crude ore useful in the invention generally is viscous, sedimentary kaolin containing micas, mixed-layered clay minerals, smectites, and vermiculites or hydrous micas. Although the starting sedimentary crude ore discussed in the examples is located in Georgia, the present invention is also directed to sedimentary crude ores having such characteristics located elsewhere in the world. Such crude ores may be found elsewhere in North America, South America, Europe, and Asia. Such countries include, but are not limited to Canada, Mexico, U.S.A., Brazil, Argentina, Finland, China, and Australia.

One method of determining whether a kaolin is from a primary or secondary deposit is by measuring the titanium dioxide ($TiO_2$) level of the kaolin. For example, the titanium dioxide amount, by percent weight of the kaolin measured on a dry basis, of Georgia sedimentary crudes is between 1% and 3.5%. Such crudes after general processing (where limited titanium dioxide removal is undertaken) often have titanium dioxide amounts of between 1.2% and 1.9%. Such crudes after targeted processing to remove titanium dioxide (such as by selective flocculation, flotation, or magnetic separation methods) often have titanium dioxide levels between 0.1 and 0.7%, and generally have levels at or above 0.3% due to the substantial cost of such targeted titanium dioxide removal processes. In contrast, the titanium dioxide amount of primary deposits located in Cornwall, England, is generally between 0.02 and 0.4%. After general processing, such kaolin generally only contains 0.01 to 0.2% titanium dioxide. Generally, primary kaolin deposits do not undergo targeted titanium dioxide removal processes as they contain such low levels of titanium that may be substituted for primary elements within silicate minerals or occur in low levels in accessory minerals such as sphene, $CaTi[SiO_4]$ $(O,OH,F)$, andradite, $Ca_3(Fe,Ti)_2Si_3O_{12}$, Ilmenite, $FeTiO_3$, or perovskite, $CaTiO_3$, rather than occurring as titania minerals such as anatase, with lesser amounts of rutile or brookite, as typical for most commercial sedimentary kaolins. The above percentages are for titanium dioxide, in weight percent, as measured in bulk sample on a dry basis using an x-ray fluorescence spectrometer.

The kaolin pigment of the invention when used in a coating formulation yields coated paper, which exhibits "good" sheet gloss and "good" print gloss.

The pigment product of the invention preferably has a particle size distribution H "psd" such that at about 80% to 95% by weight of the particles have an esd smaller than 2 $\mu$m and about 20% to 40%, preferably 25% to 35%, by weight of the particles have an esd smaller than 0.25 $\mu$m, and a shape factor of at least 35, preferably, greater than 60.

As will be appreciated by those skilled in the art, the psd of a particulate product such as the pigment product according to the present invention may be determined by measuring the speeds at which dispersed particles of the particulate product under test sediment through a standard dilute aqueous suspension using a SEDIGRAPH™ instrument, such as SEDIGRAPH 5100, obtained from Micromeritics Corporation, USA. The size of a given particle is expressed in terms of the diameter of a sphere of equivalent diameter, which sediments through the suspension is expressed as the equivalent spherical diameter or esd, the parameter as referred to above. The SEDIGRAPH instrument measures and graphically records the percentage by weight of particles having esd less than a certain esd value versus esd.

The particles in these crudes, for example, the particles may be very fine booklets or fine individual particles. Attrition grinding preferably is applied to the crude particles prior to a classification step in order to increase the number of fine individual platelets. That is, the shape factor may be increased to from about 20 to about 60 or greater.

The method of a second aspect of the invention comprises:

(a) mixing a raw kaolin clay crude, comprising about 0.9 to 26.0% by weight mica and about 0.9% to about 15.0% by weight smectite comprising $K_2O$ content between about 0.10% to about 3.0% by weight and MgO content between about 0.03% to about 0.50% by weight, based on the weight of the kaolin clay, with water to form an aqueous suspension containing from 20% to 70% of kaolin on a dry weight basis;

(b) subjecting the suspension produced by step (a) to attrition grinding using a particulate grinding medium for a time sufficient to delaminate the majority of stacks of kaolin crude to an average shape factor value to the kaolin clay particles ranging between from about 35 to about 65;

(c) separating the suspension of ground kaolin clay from the particulate grinding medium; and (d) subjecting the suspension of step (c) to a particle size classification step;

(e) dewatering the suspension to a ground kaolin clay classified in step (d) to recover a pigment product therefrom, said product comprising a phyllosilicate assemblage of minerals that yield a $K_2O$ content between about 0.12% to about 0.8% by weight and MgO content between about 0.04% to about 0.30% by weight, based on the dry weight of the kaolin pigment.

Beneficiation steps to improve clay brightness, such as magnetic separation, ozone, reduced-acid leaching, flotation, or selective flocculation, may be performed on the clay suspension or slurry prior to or after the attrition grinding step of step (b).

Typically, in step (a) the crude is initially crushed and then mechanically worked, such as by blunging in waters preferably containing clay dispersant, such as, for example, one or more inorganic or organic agents well known in the art. In the invention, it is preferred to use a mixture of sodium hexametaphosphate and soda ash. Generally, the solids of the blunged clay are in the range of 20% to 65%. The blunged clay slurry may be degritted by passing the slurry through dreg boxes and a +325 mesh (U.S. standard) screen to remove to coarse (grit) particles larger than 45 microns. The slurry may then be subjected to a high intensity magnetic separator to remove the iron-bearing minerals from the clay.

From the magnetic separator, and as described in step (b), the clay slurry is subjected to an attrition grinding step using a particulate grinding medium for a time sufficient to dissipate in the suspension enough energy to impart an average shape factor value to the particles ranging from about 35 to 60 or greater. The amount of energy may range from 20 to 100 kWh, preferably, about 25 to 50 kWh energy per ton of kaolin.

The attrition grinding mill is equipped with a stirrer, which is capable of being rotated at a speed such that a vortex is formed in the suspension in the mill during grinding. The particulate grinding medium preferably has a specific gravity of 2 or more, and advantageously comprises grains of silica sand or similar media, the grains generally having diameters not larger than about 2 mm and not smaller than about 0.25 mm As recited in step (c), the slurry of ground kaolin clay is separated from the grinding medium in a known manner, such as by passing the suspension through a sieve of appropriate aperture size, for example, a sieve having normal aperture size in the range of from about 0.1 mm to about 0.25 mm.

After the separation step (c), the clay slurry is passed through a Bird centrifuge for a classification step. In step (d), the clay is classified to a particle size distribution such that 80% to 95% by weight, preferably 85% to 92% by weight of the particles have an esd less than 2 microns and between 20% to 40%, preferably between 25% to 35% by weight of the particles have an esd less than 0.25 microns.

In step (e), the suspension of ground kaolin may be dewatered in one of the ways well known in the art, such as filtration, centrifugation, evaporation and the like. Between steps (d) and (e), the suspension may be subjected to a leaching process to remove iron oxides and to change the shade of the clay. The leaching step may involve filtration to separate the dissolved iron and salts from the clay products.

After the dewatering step (e), the solids content of the slurry may be about 50% by weight, preferably ranging from 61% to at least 64.0% by weight of kaolin clay particles in dry weight form. This solids content represents "good" rheology.

The viscous clay crude component of the feed to produce the pigment product of the invention may range from about 70% by weight to about 100% by weight, based on the dry weight of the kaolin clay. If the particle size distribution of the kaolin crude particles is 75% by weight less than 2 microns (coarse clay), then a viscous clay could be defined as having a 15+ shape factor in bulk, and the <2 micron particles would have a shape factor of 25 or greater. The crude viscosity measured by Brookfield would be about 1500 cps or greater at 70% solids. If the particle size distribution of the kaolin crude particles is 75% greater than 2 microns (fine clay), then the viscous clay could be defined as having a shape factor 25 or greater, and a crude Brookfield viscosity of 1500 cps or greater at 70% solids. Viscous clay can occur as separate clay beds from non-viscous clays or it could occur as bands within individual non-viscous clay beds.

The invention uses whole or nearly whole, from about 70% to 100%, poor rheology (viscous) crude which generally is not mined or which is blended at a level below 50% solids with good rheology crudes. It has been found by the inventors that these poor quality crudes can be used to produce a very high value product for the paper industry.

According to the present invention in a third aspect there is provided a coating composition for use in producing gloss coatings on paper and other substrates which composition comprises an aqueous suspension of a particulate pigment together with a hydrophilic adhesive or binder, wherein the particulate pigment comprises the pigment product according to the first aspect of the invention.

The pigment product according to the first aspect of the present invention may be used in paper coating as follows.

The clay content of the pigment in a paper coating composition according to the third aspect of the invention may be greater than 60% by weight, preferably at least 70%, preferably as high as possible but still giving a suitably fluid composition which may be used in coating. The composition may include a dispersing agent, generally up to 2% by weight of a polyelectrolyte based on the dry weight of pigment present. For example, polyacrylates and copolymers containing polyacrylate units are well known as suitable polyelectrolytes.

The pigment product according to the first aspect of the invention may be used as the sole pigment in the paper coating composition according to the third aspect, or it may be used in conjunction with one or more other known pigments, such as for example, (commercially available) kaolin, calcined kaolin, natural or precipitated calcium carbonate, titanium dioxide, calcium sulphate, satin white, talc and so called "plastic pigment". When a mixture of pigments is used, the pigment product according to the first aspect of the invention is preferably present in the mixture in an amount of at least 80% of the total dry weight of the mixed pigments.

The binder of the composition according to the third aspect may conveniently comprise an adhesive derived from natural starch obtained from a known plant source, for example, wheat, maize, potato or tapioca although it is not essential to use starch as a binder ingredient. Other binders, which may be used with or without starch, are mentioned later.

Where starch is employed as a binder ingredient, the starch may be unmodified or raw starch, or it may be modified by one or more chemical treatments known in the art. The starch may, for example, be oxidized to convert some of its —$CH_2OH$ groups to —COOH groups. In some cases the starch may have a small proportion of acetyl, —$COCH_3$, groups. Alternatively, the starch may be chemically treated to render it cationic or amphoteric (with both cationic and anionic charges). The starch may also be converted to starch ether, or hydroxyalkylated starch by replacing some —OH groups with, for example, —$O.CH_2.CH_2OH$ groups, —$O.CH_2.CH_3$ groups or —$O.CH_2.CH_2.CH_2OH$ groups. A further class of chemically treated starches, which may be used, is that known as the starch phosphates. Alternatively, the raw starch may be hydrolyzed by means of a dilute acid or an enzyme to produce a gum of the dextrin type. The amount of the starch binder used in the composition according to the third aspect is preferably from 4% to 25% by weight, based on the dry weight of pigment. The starch binder may be used in conjunction with one or more other binders, for example synthetic binders of the latex or polyvinyl acetate or polyvinyl alcohol type. When the starch binder is used in conjunction with another binder, such as a synthetic binder, the amount of the starch binder is preferably from 2% to 20% by weight, and the amount of the synthetic binder from 2% to 12% by weight, both based on the weight of dry pigment. Preferably, at least 50% by weight of the binder mixture comprises modified or unmodified starch.

According to the present invention in a fourth aspect there is provided a method of use of the coating composition according to the third aspect which comprises applying the composition to coat a sheet of paper and calendering the paper to form a gloss coating thereon. Preferably, the gloss coating is formed on both sides of the paper.

Calendering is a well known process in which paper smoothness and gloss is improved and bulk is reduced by passing a coated paper sheet between calender nips or rollers one or more times. Usually, elastomer coated rolls are employed to give pressing of high solids compositions. An elevated temperature may be applied.

Five or more passes through the nips may be applied.

The paper after coating and calendaring in the method according to the fourth aspect may have a total weight per unit area in the range 30 g.m$^{-2}$ to 70 g.m$^{-2}$, especially 49 g.m$^{-2}$ to 65 g.m$^{-2}$ or 36 g.m$^{-2}$ to 48 g.m$^{-2}$. The final coating preferably has a weight per unit area preferably from 3 g.m$^{-2}$ to 20 g.m$^{-2}$, especially from 5 g.m$^{-2}$ to 13 g.m$^{-2}$. Such a coating may be applied to both sides of the paper. Thus, the coated paper may be LWC or ULWC paper. The paper gloss may be greater than 45 TAPPI units and the Parker Print Surf value at a pressure of 1 mPa of each paper coating may be less than 1 μm.

The gloss of a coated paper surface may be measured by means of a test laid down in TAPPI Standard No 480 ts-65. The intensity of light reflected at an angle from the surface of the paper is measured and compared with a standard of known gloss value. The beams of incident and reflected light are both at an angle of 75° to the normal to the paper surface. The results are expressed in TAPPI gloss units.

The Parker Print Surf test provides a measure of the smoothness of a paper surface, and comprises measuring the rate at which air under pressure leaks from a sample of the coated paper which is clamped, under a known standard force, between an upper plate which incorporates an outlet for the compressed air and a lower plate, the upper surface of which is covered with a sheet of either a soft or a hard reference supporting material according to the nature of the paper under test. From the rate of escape of the air, a root mean cube gap in μm between the paper surface and the reference material is calculated. A smaller value of this gap represents a higher degree of smoothness of the surface of the paper under test.

The pigment of the invention has been shown to give greater improvement in sheet brightness, opacity, and gloss as compared to standard products in starch containing binder systems. However, an improvement may also be obtained where other known starch-free binders are employed (with or without starch present). In each case the adhesive or binder may form from 4% to 30%, preferably from 8% to 20%, and most preferably from 8% to 15% by weight of the solids content of the composition. The amount employed will depend upon the composition and the type of adhesive, which may itself incorporate one or more ingredients. For example, hydrophilic adhesives used in the art may incorporate one or more of the following adhesive or binder ingredients for use in the following stated amounts:

(a) latex: levels range from 4% by weight to 20% by weight. The latex may comprise for example a styrene butadiene, acrylic latex, vinyl acetate latex, or styrene acrylic copolymers.
(b) other binders: levels again range from generally 4% by weight to 20% by weight. Examples of other binders include casein, polyvinyl alcohol and polyvinyl acetate.

Additives in various known classes may, depending upon the type of coating and material to be coated, be included in the coating composition according to the third aspect of the present invention. Examples of such classes of optional additive are as follows:

(a) cross linkers: generally in levels of up to 5% by weight; for example glyoxals, melamine formaldehyde resins, ammonium zirconium carbonates.
(b) water retention aids: generally up to 2% by weight, for example sodium carboxymethyl cellulose, hydroxyethyl cellulose, PVA (polyvinyl acetate), starches, proteins, polyacrylates, gums, alginates, polyacrylamide bentonite and other commercially available products sold for such applications.
(c) viscosity modifiers or thickeners: generally in levels up to 2% by weight; for example polyacrylates, emulsion copolymers, dicyanamide, triols, polyoxyethylene ether, urea, sulphated castor oil, polyvinyl pyrrolidone, montmorillonite, CMC (carboxymethyl celluloses), sodium alginate, xanthan gum, sodium silicate, acrylic acid copolymers, HMC (hydroxymethyl celluloses), HEC (hydroxyethyl celluloses) and others.
(d) lubricity/calendering aids: generally in levels up to 2% by weight, for example calcium stearate, ammonium stearate, zinc stearate, wax emulsions, waxes, alkyl ketene dimer, glycols.
(e) dispersants: generally in levels up to 2 per cent by weight, for example polyelectrolytes such as polyacrylates and copolymers containing polyacrylate species, especially polyacrylate salts (such as sodium and aluminium optionally with a group II metal salt), sodium hexametaphosphates, non-ionic polyol, polyphosphoric acid, condensed sodium phosphate, non-ionic surfactants, alkanolamine and other reagents commonly used for this function.
(f) antifoamers/defoamers: generally in levels up to 1% by weight, for example blends of surfactants, tributyl phosphate, fatty polyoxyethylene esters plus fatty alcohols, fatty acid soaps, silicone emulsions and other silicone containing compositions, waxes and inorganic particulates in mineral oil, blends of emulsified hydrocarbons and other compounds sold commercially to carry out this function.
(g) dry or wet pick improvement additives: generally in levels up to 2% by weight, for example melamine. resin, polyethylene emulsions, urea formaldehyde, melamine formaldehyde, polyamide, calcium stearate, styrene maleic anhydride and others.
(h) dry or wet rub improvement and abrasion resistance additives: generally in levels up to 2% by weight, for example glyoxal based resins, oxidized polyethylenes, melamine resins, urea formaldehyde, melamine formaldehyde, polyethylene wax, calcium stearate and others.
(i) gloss-ink hold-out additives: generally in levels up to 2% by weight, for example oxidized polyethylenes, polyethylene emulsions, waxes, casein, guar gum, CMC, HMC, calcium stearate, ammonium stearate, sodium alginate and others.
(j) optical brightening agents (OBA) and fluorescent whitening agents (FWA): generally in levels up to 1% by weight, for example stilbene derivatives.
(k) dyes: generally in levels up to 0.5% by weight.
(l) biocides/spoilage control agents: generally in levels up to 1% by weight, for example metaborate, sodium dodecylbenene sulphonate, thiocyanate, organosulphur, sodium benzonate and other compounds sold commercially for this function, such as the range of biocide polymers sold by Calgon Corporation.
(m) leveling and evening aids: generally in levels up to 2% by weight, for example non-ionic polyol, polyethylene emulsions, fatty acid, esters and alcohol derivatives, alcohol/ethylene oxide, sodium CMC, HEC, alginates, calcium stearate and other compounds sold commercially for this function.
(n) grease and oil resistance additives: generally in levels up to 2% by weight of additives such as oxidized polyethylenes, latex, SMA (styrene maleic anhydride), polyamide, waxes, alginate, protein, CMC, HMC.
(o) water resistance additives: generally in levels up to 2% by weight, of additives such as oxidized polyethylenes, ketone resin, anionic latex, polyurethane, SMA, glyoxal, melamine resin, urea formaldehyde, melamine formaldehyde, polyamide, glyoxals, stearates and other materials commercially available for this function.
(p) insolubiliser: generally in levels up to 2% by weight.

For all of the above additives, the percentages by weight quoted are based on the dry weight of pigment (100%) present in the composition. Where the additive is present in a minimum amount the minimum amount may be 0.01% by weight based on the dry weight of pigment.

The method according to the fourth aspect of the present invention may be carried out in a known way which will depend upon the material to be coated, the coating composition to be applied and other factors as determined by the operator, such as speed and ease of runnability and use of a conventional coating machine.

Methods of coating paper and other sheet materials are widely published and well known. For example, there is a review of such methods published in Pulp and Paper International, May 1994, page 18 et seq. Sheets may be coated on the sheet-forming machine. This coating may be "on-machine", or "off-machine" on a coater or coating machine. Use of high solids compositions is desirable in the coating method because it leaves less water to evaporate subsequently. However, as is well known in the art, the solids level should not be so high that high viscosity and leveling problems are introduced.

All known methods of coating according a fourth aspect of the present invention require (i) a means of applying the coating composition to the material to be coated, viz. an applicator; and (ii) a means for ensuring that a correct level of coating composition is applied, viz. a metering device. When an excess of coating composition is applied to the applicator, the metering device is downstream of it. Alternatively, the correct amount of coating composition may be applied to the applicator by the metering device, for example, a film press. At the points of coating application and metering, the paper web support ranges from a backing roll, such as via one or two applicators, to nothing (just tension). The time the coating is in contact with the paper before the excess is finally removed is the dwell time—and this may be short, long or variable.

The coating is usually added by a coating head at a coating station. According to the quality desired, paper grades are uncoated, single coated, double coated and even triple coated. When providing more than one coat, the initial coat (precoat) may have a cheaper formulation and optionally less pigment in the coating composition. A coater that is applying a double coating, such as a coating on each side of the paper, will have two or four coating heads, depending on the number of sides coated by each head. Most coating heads coat only one side at a time, but some roll coaters (such as a film press, a gate roll, and a size press) coat both sides in one pass.

Examples of known coaters which may be employed in step (b) include air knife coaters, blade coaters, rod coaters, bar coaters, multi-head coaters, roll coaters, roll/blade coaters, cast coaters, laboratory coaters, gravure coaters, kiss coaters, liquid application systems, reverse roll coaters and extrusion coaters.

Embodiments of the present invention will now be described by way of example with reference to the following illustrative Examples.

EXAMPLE 1

Example 1 shows that pigment products made from viscous crude clay according to the teachings of the invention are different from those of conventional, non-viscous clay because of their unique chemical composition as well as their poor fluidity at high solids concentration.

Both viscous crude and non-viscous crude clays from a coarse clay mine in Washington County, Georgia, were beneficiated in a typical process scheme for a standard No.2 coating clay under the same processing conditions. The products had practically the same particle size distribution: about 81% particles less than 2 microns and about 20% particles less than 0.25 microns. Table 2 shows their differences in chemical compositions and viscosities:

TABLE 2

| Oxide (wt %) | No.2 Coating Clay From Non-Viscous Crude Clay | No. 2 Coating Clay From Viscous Crude Clay |
| --- | --- | --- |
| $SiO_2$ | 45.39 | 45.31 |
| $Al_2O_3$ | 38.87 | 38.80 |
| $TiO_2$ | 2.028 | 1.694 |
| $Fe_2O_3$ | 0.208 | 0.588 |
| MgO | 0.024 | 0.053 |
| CaO | 0.026 | 0.072 |
| $Na_2O$ | 0.059 | 0.079 |
| $K_2O$ | 0.018 | 0.259 |
| Brookfield Viscosity (#2 spindle @ 20 rpm) | 260 c.p.s. | 2000 c.p.s. |
| Hercules Viscosity (rpm at 18 dynes) | 1310 rpm | 180 rpm |
| Slurry Solids | 70% | 68.7% |

The No. 2 coating clay made from viscous crude has characteristically higher concentrations of potassium and magnesium, indicating the presence of micaceous and smectitic phyllosilicates. Its viscosity is too poor as a No. 2 coating clay, which generally requires a shippable slurry of minimum 70% solids.

For Examples 2, 3 and 4 described below, the coating composition used is that for a rotogravure type of printing method of coating paper in the ULWC grade. The composition used for Examples 2, 3 and 4 is shown in Table 3:

TABLE 3

| Ingredient | Parts By Weight |
| --- | --- |
| Pigment Under Test | 100 |
| Synthetic Latex Binder | 6 |
| Lubricant | 1 |
| Dispersant | 0.1 |
| Thickener | 0.2 |
| Adjusted pH With Caustic | 8.5 |

The synthetic latex binder was a styrene butadiene rubber binder of the type, which has been found to be suitable for use in rotogravure coating formulations. The parts by weight shown are parts by weight of latex solids.

The lubricant was a calcium stearate of the type which is commonly used in paper coating colors.

The dispersant was a sodium polyacrylate marketed under the trade name "C-211" and available from Rhone-Poulenc.

The thickener was an alkali swellable acrylic emulsion containing hydrophobic groups of a type which is found to be suitable for use in rotogravure coating formulations.

One side of a base sheet was coated. The coated paper was calendered as described herein above.

Each composition was coated onto base paper of substance weight 35 g.m$^{-2}$ by means of a coating machine of the type described in GB-A-1032536 fitted with a pond head. The paper speed was 800 m.min$^{-1}$. Samples of a coated paper were prepared at different coat weights in the range of from about 3 g.m$^{-2}$ to about 10 g.ml$^{-2}$ The coated paper was dried and then subjected to calendaring by passage three times between the rolls of a supercalender at a temperature of 150° F. and a pressure of 200 psi.

The samples of calendered coated paper prepared from each of the coating compositions were then tested for sheet gloss; sheet brightness; opacity; Parker Print Surf (PPS) porosity using Parker Print Surf Instrument; Parker Print Surf (PPS) roughness using the soft backing material and a pressure of 1000 kPa; and the missing dot test (known to those skilled in the art).

EXAMPLE 2

Example 2 demonstrates the use of naturally platy crude to make pigments of the invention, and the application of the pigments in a coating composition for rotogravure printing. This Example 2 shows that the products of the invention, the delaminated products made from viscous crude kaolin with preferred amounts of non-kaolin phyllosilicates, yield unexpectedly superior glossing characteristics relative to conventional delaminated products.

Five pigments were made from five different viscous, Georgia sedimentary crudes A through E. Crudes A, B, C and D are coarse crudes (<80% <2 microns) whereas crude E is a fine crude (>90% <2 microns). The crudes were blunged, degritted, magnet, ground, classified, leached, filtered and dewatered. The final pigments were assayed by XRF to have chemistries shown in Table 4.

TABLE 4

| Sample | Pigment A | Pigment E | Pigment C | Pigment D | Pigment E |
| --- | --- | --- | --- | --- | --- |
| $SiO_2$ | 44.2780 | 45.6510 | 45.3290 | 44.7290 | 44.9460 |
| $Al_2O_3$ | 38.3080 | 39.4060 | 39.2640 | 38.6530 | 38.1600 |

TABLE 4-continued

| Sample | Pigment A | Pigment B | Pigment C | Pigment D | Pigment E |
|---|---|---|---|---|---|
| $TiO_2$ | 1.0540 | 1.0350 | 1.1050 | 0.9160 | 0.9930 |
| $Fe_2O_3$ | 0.3560 | 0.3470 | 0.5710 | 0.4420 | 1.0300 |
| MgO | 0.0814 | 0.1052 | 0.0464 | 0.0548 | 0.0524 |
| CaO | 0.6514 | 0.5111 | 0.0336 | 0.0502 | 0.0370 |
| $Na_2O$ | 0.1542 | 0.1636 | 0.1092 | 0.1419 | 0.1520 |
| $K_2O$ | 0.1677 | 0.1788 | 0.1725 | 0.1814 | 0.3815 |

The pigments were made down into coating colors with 15 parts No.2 coating clay and ran against 2 control pigments. One control pigment was delaminated clay with 15 parts No.2 coating clay. The second control was delaminated clay with 12 parts No.2 coating clay and 3 parts plastic pigment. Plastic pigment is an expensive pigment additive that is used to enhance paper sheet gloss. Coating results are shown in Table 5.

TABLE 5

| | Description | | | | | | |
|---|---|---|---|---|---|---|---|
| | 75 Delaminated | 75 Delaminated | 75 Pigment A | 75 Pigment B | 75 Pigment C | 75 Pigment D | 75 Pigment E |
| | 15 No. 2 Coating Clay 10 Calcined | 12 No. 2 Coating Clay 10 Calcined 3 Plastic Pigment | 15 No. 2 Coating Clay 10 Calcined | 15 No. 2 Coating Clay 10 Calcined | 15 No. 2 Coating Clay 10 Calcined | 15 No. 2 Coating Clay 10 Calcined | 15 No. 2 Coating Clay 10 Calcined |
| Sheet (ISO) Brightness | 68.64 | 69.67 | 69.02 | 67.79 | 68.53 | 69.00 | 68.56 |
| Sheet Opacity, % | 82.64 | 83.60 | 83.28 | 82.69 | 83.47 | 83.42 | 82.95 |
| Sheet Gloss, % | 49.10 | 54.42 | 56.34 | 54.49 | 54.34 | 54.85 | 50.52 |

In the first column of Table 5, the coating composition has 75 parts delaminated clay, 15 parts No. 2 clay, and 10 parts calcined clay, while in the second column, 3 parts of a No.2 clay have been replaced by 3 parts of plastic pigment, which adds significant cost to the composition. A comparison of results for these two compositions show that there is up to 5 units improvement in sheet gloss in the composition with plastic pigment and 1 unit improvement in sheet brightness, and one unit improvement in sheet opacity.

The pigments of the invention were also used in the coating composition of Table 3. In Table 5, it can be seen that coatings with Pigments A through D all show improvements in sheet brightness, opacity, and sheet gloss compared to the pigment of the first column and comparable results to the pigment of the second column. Tables 4 and 5 demonstrate that the pigments of the invention, which have significantly different chemical composition as compared to a commercial delaminated clay, show significantly improved performance in coating application using the rotogravure printing method.

EXAMPLE 3

Example 3 shows that the products of the invention, the delaminated products made from viscous crude clay can eliminate expensive pigment components (such as plastic pigment or equivalent).

Three pigment products produced from 100% viscous, Georgia sedimentary kaolin feed were ran in coating formulations against a standard paper coating formulation containing standard delaminated kaolin, a No.2 coating kaolin, and 3 parts plastic pigment to enhance sheet gloss. The paper coated with pigments made from the viscous crude, in accordance with the teachings of the invention, performed equally to or better than the paper coated with the standard clays and the expensive plastic pigments.

The crude in this Example 3 were selected from coarse (<80% <2 microns) sedimentary kaolin strata located in Middle Georgia. The crude assays determined by XRF are shown in Table 6. Crude F had a starting mica content of about 3 wt. % and a starting smectite content of about 2 wt. %, based on the dry weight of the kaolin crude. Crude G had a starting mica content of about 5 wt. % and a starting smectite content of about 3 wt. %, based on the dry weight of the kaolin crude.

TABLE 6

| Sample | Crude F | Crude G |
|---|---|---|
| $SiO_2$ | 44.6480 | 44.367 |
| $Al_2O_3$ | 38.3750 | 38.317 |
| $TiO_2$ | 1.3140 | 1.470 |
| $Fe_2O_3$ | 0.8500 | 0.534 |
| MgO | 0.0556 | 0.0862 |
| CaO | 0.0329 | 0.0518 |
| $Na_2O$ | 0.0408 | 0.0675 |
| $K_2O$ | 0.3501 | 0.6167 |

The crude was blunged, degritted to remove >45 micron particles, passed through a magnetic separator and then ground in an attrition grinder. The ground products were classified to 90 wt. % <2 microns using a Bird classifier, and the clay was leached, filtered and dewatered to about 61% to 65% solids. The pigment properties are shown in Table 7, and the final coated sheet properties relative to the control are shown in Table 8.

TABLE 7

| Description | Delaminated Clay | No. 2 Coating Clay | Pigment F | Pigment G |
|---|---|---|---|---|
| Brightness (GE) | 88.3 | 86.4 | 88.5 | 88.1 |
| % <2 micron | 84 | 83 | 92 | 90 |
| % <0.25 micron | 23 | 37 | 36 | 31 |
| Solids % | 67 | 70 | 63 | 62 |

TABLE 8

| Description | 75 Delam/12 #2 Coating Clay 10 Calcined Clay Plastic Pigment | Pigment F 10 Calcined Clay | Pigment G 10 Calcined Clay |
|---|---|---|---|
| TAPPI Brightness, ISO | 68.22 | 67.34 | 67.19 |
| TAPPI Opacity, % | 83.83 | 83.79 | 84.02 |
| Sheet Gloss 75°, % | 53.79 | 54.56 | 51.71 |
| Sheet Gloss 20°, % | 7.22 | 8.10 | 7.62 |

The coating composition in the first column of Table 8 has 75 parts delaminated clay, 12 parts No.2 clay, 10 parts of calcined clay and 3 parts plastic pigment. In the other two coating compositions, the 12 parts No. 2 clay and 3 parts of plastic pigment have been replaced by the pigments of the invention. The results show that the pigments of the invention successfully replace the expensive plastic pigment by showing opacity and sheet gloss, especially the low angle (20°) sheet gloss, which is a good indicator of micro-smoothness of the coated surface.

EXAMPLE 4

Example 4 shows that the viscous crude may be used as a major blend component along with other raw material component(s) in making the products of the invention. Example 4 further demonstrates the pigment produced according to the teachings of the invention and its use in a coating composition for use in rotogravure printing.

The pigment was made from a viscous Georgia sedimentary kaolin crude. The product was made such that 80% degritted crude was blended with 20% coarse product obtained from a Bird centrifuge. The degritted, viscous crude contained 0.15 wt. % of MgO (4.5% smectite component) and 1.4 wt. % of $K_2O$ (12% mica. component), based on the dry weight of the kaolin; whereas the coarse product from the Bird centrifuge contained 0.04 wt. % of MgO (1.2 wt. % smectite component) and 0.2 wt. % of $K_2O$ (1.7 wt. % mica component). The 80/20 blend was scalped in a Bird centrifuge to remove the majority of oversized particles >45 microns to 0.07 wt. % of MgO (2.1 wt. % smectite component) and 0.28 wt. % of $K_2O$ (2.4 wt. % mica component). The material was then passed through a magnet to remove iron impurities and then ground in an attrition grinder. The ground product was classified through a Bird centrifuge to about 88% <2 microns, leached, filtered and dewatered to 63% solids. The <0.25 micron content of the product was 29%, and BET (by Nitrogen) surface was 16.8 m2/g.

The final product MgO content was 0.06 wt. % (1.8 wt. % of smectite component) and 0.22 wt. % of $K_2O$ (1.9 wt. % of mica component).

Paper coating results using a formulation and control similar to that describe for Example 4 are

TABLE 9

| | 75 Delam/12 #2 Coating Clay 10 Calcined Clay Plastic Pigment | Pigment H 10 Calcined Clay |
|---|---|---|
| Sheet Brightness, ISO | 67.37 | 66.83 |
| Opacity, % | 83.15 | 82.91 |
| Sheet Gloss 75°, % | 49.51 | 54.07 |
| Sheet Gloss 20°, % | 6.72 | 7.80 |

The coating composition, shown in the first column of Table 9 comprised, 75 parts delaminated clay, 12 parts No. 2 clay, 10 parts of calcined clay and 3 parts plastic pigment. The coasting composition in the second column comprised 90 parts Pigment H and 10 parts calcined clay. Pigment H, made from the teachings of the invention, shows equivalent sheet brightness, and opacity. The coating composition with pigment H also shows significantly higher, such as up to 5 units, sheet gloss at the 75° angle of gloss measurement. At the 200 angle of gloss measurement, there is over a one unit improvement, which signifies substantial improvement in the micro-smoothness of the paper coated with the composition made from pigment H.

What is claimed is:

1. A pigment product suitable for a paper coating composition, the pigment comprising kaolin of a sedimentary crude having a phyllosilicate assemblage of minerals that yield a final pigment MgO content ranging from about 0.04% to about 0.3%, by weight, and a final pigment $K_2O$ content ranging from about 0.12% to about 0.8%, by weight, based on the dry weight of the pigment.

2. A pigment product according to claim 1 wherein the MgO content ranges from about 0.05% to about 0.2%, by weight, and the $K_2O$ content ranges from about 0.14% to about 0.8%, by weight on a dry weight basis of the pigment.

3. A pigment product according to claim 1 wherein the MgO content ranges from about 0.06% to about 0.1%, by weight and the $K_2O$ content ranges from about 0.15% to about 0.25%, by weight on a dry weight basis of the pigment.

4. A pigment product according to claim 1 wherein the MgO content ranges from about 0.05% to about 0.2%, by weight on a dry weight basis of the pigment.

5. A pigment product according to claim 1 wherein the MgO content ranges from about 0.05% to about 0.1%, by weight on a dry weight basis of the pigment.

6. A pigment product according to claim 1 wherein the $K_2O$ content ranges from about 0.14% to about 0.3%, by weight on a dry weight basis of the pigment.

7. A pigment product according to claim 1 wherein the $K_2O$ content ranges from about 0.3% to about 0.5%, by weight on a dry weight basis of the pigment.

8. A pigment product according to claim 1 wherein the pigment product comprises about 1.2% to about 9.1%, by weight smectitic clays on a dry weight basis of the pigment.

9. A pigment product according to claim 1 wherein the pigment product comprises about 1.0% to about 6.7%, by weight micacous clays on a dry weight basis of the pigment.

10. A pigment product according to claim 1 wherein the pigment product comprises about 1.5% to about 6% smectitic clays on a dry weight basis of the pigment.

11. A pigment product according to claim 1 wherein the pigment product comprises about 1.2% to about 3.4%, by weight micacous clays on a dry weight basis of the pigment.

12. A pigment product according to claim 1 wherein the pigment product comprises about 1.8% to about 3.0% by weight smectitic clays on a dry weight basis of the pigment.

13. A pigment product according to claim 1 wherein the pigment product comprises about 1.3% to about 2.1% by weight micacous clays on a dry weight basis of the pigment.

14. A pigment product according to claim 1 wherein the pigment product is produced from a viscous sedimentary kaolin.

15. A pigment product according to claim 1 wherein the pigment product is produced from a viscous Georgia-South Carolina sedimentary kaolin.

16. A pigment product according to claim 1 wherein the pigment product has a shape factor greater than 60.

17. A pigment product according to claim 1 wherein the pigment product has a particle size distribution such that greater than 80% by weight of the kaolin particles have an esd (equivalent spherical diameter) of less than 2 microns and greater than 12% by weight of the particles have an esd of less than 0.25 microns.

18. A pigment product according to claim 1 wherein the pigment product is processed from a kaolin of a sedimentary crude having a shape factor greater than 15.

19. A pigment product according to claim 1 wherein the pigment product has a shape factor greater than 35.

20. A pigment product according to claim 1 wherein the product has particles with a surface area greater than 12 m$^2$/g when measured by the BET method.

21. A pigment product according to claim 1 wherein the product has particles with a surface area of from 15 m$^2$/g to 20 m$^2$/g when measured by the BET method.

22. A coating composition for use in producing gloss coatings on paper and other substrates, which composition comprises an aqueous suspension of a particulate pigment together with a hydrophilic adhesive, wherein the particulate pigment comprises a pigment product according to claim 1.

23. A composition according to claim 22 wherein the pigment product has a viscous clay content of from about 70% to about 100% based on the dry weight of the pigment product.

24. A method comprising applying the coating composition of claim 22 to coat a sheet of paper and calendering the paper to form a gloss coating thereon.

25. A method of producing a pigment product suitable for use in a paper coating composition comprising:
    providing a kaolin of a sedimentary crude having a phyllosilicate assemblage of minerals; and
    forming a pigment product from said kaolin having a MgO content ranging from about 0.04% to about 0.3% by weight, and a K$_2$O content ranging from about 0.12% to about 0.8% by weight, based on the dry weight of the pigment.

26. A method according to claim 25 wherein forming the pigment comprises:
    mixing the sedimentary kaolin crude, comprising at least about 0.9% by weight mica and about 0.9% by weight smectite, based on the dry weight of the crude, where the K$_2$O content ranges from about 0.10% by weight to about 3.0% by weight and the MgO content ranges from about 0.03% by weight to about 0.50% by weight, based on the dry weight of the kaolin crude, with water to form an aqueous suspension containing from 20% to 70% of kaolin on a dry weight basis;
    attrition grinding the aqueous suspension using a particulate grinding medium for a time sufficient to delaminate the majority of stock of kaolin crude with a shape factor from about 35 to greater than 60;
    separating the suspension of ground kaolin clay from the particulate grinding medium;
    classifying the particles in the aqueous suspension by size; and
    dewatering the aqueous suspension of ground kaolin clay to recover a pigment product.

27. A pigment product produced according to the method of claim 26.

28. A pigment product according to claim 27, wherein said pigment product comprises from about 1.0% to about 6.7% by weight mica and about 1.2% to about 9.1% by weight smectite based on the dry weight of kaolin clay in the pigment product, wherein the K$_2$O content of the pigment product ranges from about 0.12% by weight to about 0.8% by weight and the MgO content of the pigment product ranges from about 0.04% by weight to about 0.3% by weight, based on the dry weight of the kaolin clay in the pigment product, and the particle size distribution of the final pigment product is such that about 80% to 95% by weight of the particles have an esd less than 2 microns.

29. A pigment product according to claim 27, wherein the sedimentary kaolin crude has a MgO content of from about 0.03% to about 0.50% by weight and a K$_2$O content from about 0.1% by weight to about 3.0% by weight, based on the dry weight of the kaolin crude.

30. A pigment product according to claim 27, wherein the sedimentary kaolin crude has a MgO content of from about 0.04% to about 0.25% by weight and a K$_2$O content from about 0.2% by weight to about 2.0% by weight, based on the dry weight of the kaolin crude.

* * * * *

UNITED STATES PATENT AND TRADEMARK OFFICE
CERTIFICATE OF CORRECTION

PATENT NO. : 6,564,199 B1 Page 1 of 1
DATED : May 13, 2003
INVENTOR(S) : Pruett et al.

It is certified that error appears in the above-identified patent and that said Letters Patent is hereby corrected as shown below:

Column 3,
Line 4, "5,516,617" should read -- 5,576,617 --.

Signed and Sealed this

Fifteenth Day of November, 2005

JON W. DUDAS
*Director of the United States Patent and Trademark Office*